C. M. BULLER.
DOUBLE WALL PIPE.
APPLICATION FILED MAY 7, 1917.
1,308,981.
Patented July 8, 1919.
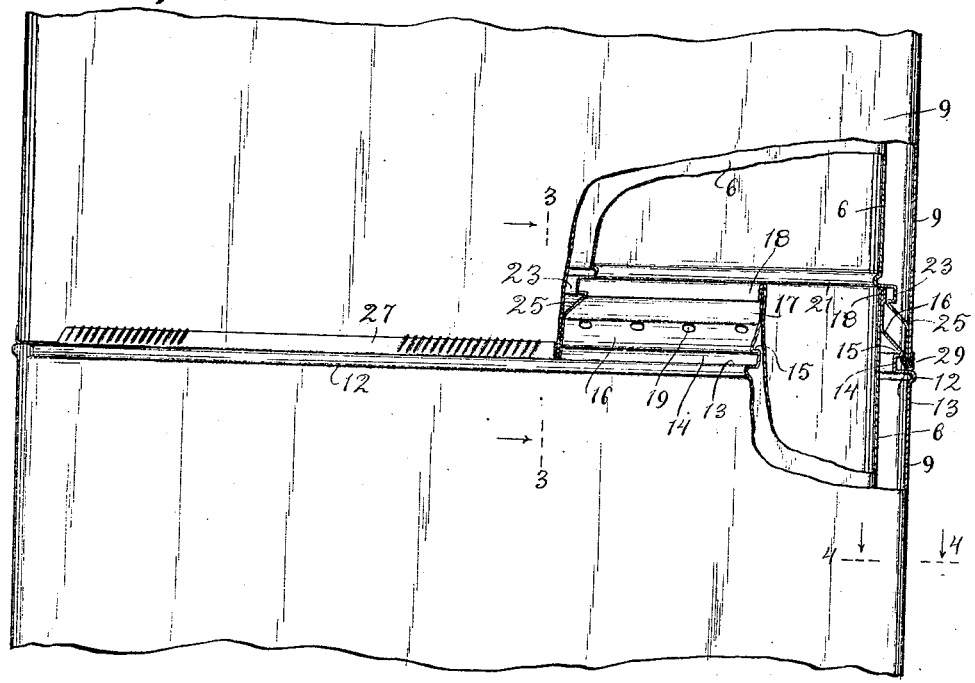
Fig. 1.
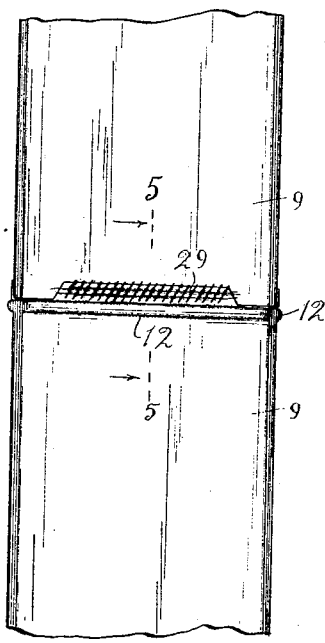
Fig. 2.
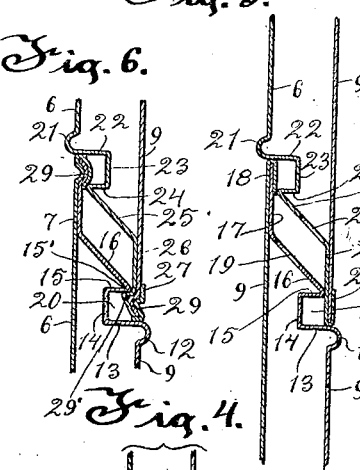
Figs. 3, 6, 5.
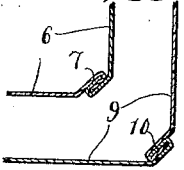
Fig. 4.
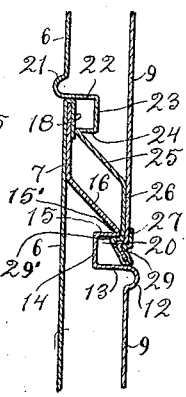
INVENTOR
Charles M. Buller.
By Morsell, Keeney & French.
ATTORNEYS

UNITED STATES PATENT OFFICE.

CHARLES M. BULLER, OF MILWAUKEE, WISCONSIN, ASSIGNOR TO L. J. MUELLER FURNACE COMPANY, OF MILWAUKEE, WISCONSIN, A CORPORATION OF WISCONSIN.

DOUBLE-WALL PIPE.

1,308,981. Specification of Letters Patent. Patented July 8, 1919.

Application filed May 7, 1917. Serial No. 166,886.

*To all whom it may concern:*

Be it known that I, CHARLES M. BULLER, a citizen of the United States, and resident of Milwaukee, in the county of Milwaukee and State of Wisconsin, have invented new and useful Improvements in Double-Wall Pipes, of which the following is a description, reference being had to the accompanying drawings, which are a part of this specification.

The invention relates to double-wall hot-air pipes.

In double wall pipes the two walls are kept separate; first, to form an air space between the inner heated wall in contact with the heated air and the outer wall which contacts with the building to keep said outer wall cool to prevent liability of fire and second to form an insulating air space to increase the heat conductivity of the space within the inner walls of the pipe. Pipes of this character are generally made in sections to be assembled on the job and the problem is to so construct the pipe sections as to suitably reinforce the inner and outer walls and their joints and particularly to provide means for interlocking the sections together with reinforced joints all of which is to be done with the least amount of material. The present invention offers one solution of this problem the particular features being the strong corner joints and the simple but strong and efficient interlocking connection between adjoining pipe sections without waste of material.

The invention further consists in the several features hereinafter set forth and more particularly defined by claims at the conclusion hereof.

In the drawings:

Figure 1 is a side view of two joined together pipe sections, parts being broken away and parts being shown in section;

Fig. 2 is a view of one of the end sides of the section shown in Fig. 1;

Fig. 3 is a section taken on the line 3—3 of Fig. 1;

Fig. 4 is a section taken on the line 4—4 of Fig. 1;

Fig. 5 is a section taken on the line 5—5 of Fig. 2;

Fig. 6 is a section similar to Fig. 5 showing a modified construction.

Each pipe section consists of an inner wall formed by the sheet metal plates 6, one for each side, joined together by an interlocking lapped corner joint 7 forming four thicknesses of metal angularly bent to form a flat corner and an outer wall formed by the sheet metal plates 9, one for each side, joined together by an interlocking lapped joint 10 forming four thicknesses angularly bent to form a flat corner. This construction greatly reinforces the walls at the corners and prevents buckling of the plates forming the walls. It will be further noted that the inner and outer walls are spaced apart at the corners to provide for free circulation of air.

The interlockable joint between the pipe sections is formed as follows: The top of the sides of the outer wall is formed with transversely extending beads 12 from which a portion 13 extends inwardly then upwardly at 14 then outwardly at 15, then inclined inwardly at 16, then parallel to the inner wall at 17 to which it is secured by the turned over edge 18 of the inner wall and by which construction the walls are held spaced apart, apertures 19 being formed in the inclined parts 16 to permit of air circulation. The parts 13, 14 and 15 form a locking recess 20 and the part 13 forms a stop shoulder which is reinforced materially by the beaded edge 12. The parts 15 and 16 also meet at a sharp angle to form a locking shoulder 15'. The bottom of each pipe section is formed by beads 21 in the inner wall extending transversely thereof from which a portion 22 extends outwardly then downwardly at 23, then inwardly at 24, then inclined inwardly at 25, then parallel to the outer wall at 26 from whence it is bent around as at 27 and clenched to the outer wall by which construction the walls are held spaced apart, apertures 28 being formed in the inclined parts 25 to permit circulation of air. The part 22 forms a thrust or stop shoulder against which the top of the inner edge of the adjoining pipe section abuts as does the edge formed at the meeting of the parts 24 and 25 which shoulder is reinforced by the beaded edge 21. The ends at their bottom are crimped in to form a bead 29 engaging the shoulders adjacent the recesses 20 or 23 as shown in Fig. 5 or Fig. 6, but in practice it has not been found necessary to use this bead entirely on the sides as will be seen by Fig. 3, a section taken on the line 3—3 of Fig. 1. It will be understood that instead of the edge 27 the turned over edge 18 may be crimped the same as the edge 27 to form a bead which will interlock with the recess formed by the parts 22, 23 and 24 or that both may be used as shown in Fig. 6.

It will be noted that by the present construction the plates forming the inner and outer walls are bent to form the joint in contradistinction to those constructions in which an additional piece is inserted between the walls and consequently the joint may be produced with less labor and material.

It will be further noted that the construction is simple and that reinforcement is provided where most desired, and the sections thus held firmly together when they are once locked in place.

What I claim as my invention is:

1. A double wall hot air pipe section comprising an inner wall and an outer wall spaced apart and secured together in spaced relations at their ends, each wall consisting of side plates having interlocked lapped joint connections angularly bent to form flat corners, said walls being spaced from each other at the corners.

2. An interlockable section of double wall hot air pipe, comprising, an inner wall and an outer wall spaced apart, a laterally projecting beaded flange formed in the outer wall at a point spaced from the upper edge thereof, a ledge extending inwardly from the top of said beaded flange, a vertical wall extending upwardly from the inner end of said ledge, a second ledge extending laterally from the vertical wall and terminating inwardly of said beaded flange, an inclined wall extending upwardly and inwardly from the outer end of the said second ledge to the adjacent edge of the inner wall, the meeting point of the outer end of the inclined wall and the said second ledge defining a sharp locking shoulder, and a securing portion extending from the inner end of the inclined wall and engaged by the adjacent upper edge of said inner wall, an inwardly projecting beaded flange formed in the inner wall at a point spaced from the lower edge thereof, a ledge extending outwardly from the bottom of said beaded flange, a vertical wall extending downwardly from the outer end of said ledge, a second ledge extending inwardly from the vertical wall and terminating outwardly of the said beaded flange, an inclined wall extending downwardly and outwardly from the inner end of the second ledge to the adjacent edge of the outer wall, the meeting point of the inner end of the inclined wall and the said second ledge defining a sharp locking shoulder, and a securing portion extending from the outer end of the inclined wall and engaged by the adjacent upper edge of said outer wall, when adjoining sections are placed together, the edge of one section abutting the adjacent beaded flange to limit the movement thereof, and means formed on the edge of each section for engaging the sharp locking shoulder of the adjacent section whereby a secure joint is obtained between adjoining sections, substantially as described.

3. An interlockable section of double wall hot air pipe, comprising, an inner wall and an outer wall apart, each wall consisting of side plates having interlocked lapped joint connections angularly bent to form flat corners, a laterally projecting beaded flange formed in the outer wall at a point spaced from the upper edge thereof, a ledge extending inwardly from the top of said beaded flange, a vertical wall extending upwardly from the inner end of said ledge, a second ledge extending laterally from the vertical wall and terminating inwardly of said beaded flange to define a locking recess, an inclined wall extending upwardly and inwardly from the outer end of the said second ledge to the adjacent edge of the inner wall, the meeting point of the outer end of the inclined wall and the said second ledge defining a sharp locking shoulder, a securing portion extending upwardly from the inner end of the inclined wall and engaging the adjacent portion of the inner wall, and an overlapped portion on the adjacent edge of the inner wall and confining the securing portion therebetween to form an extended tongue, an inwardly projecting beaded flange formed in the inner wall at a point spaced from the lower edge thereof, a ledge extending outwardly from the bottom of said beaded flange, a vertical wall extending downwardly from the outer end of said ledge, a second ledge extending inwardly from the vertical wall and terminating outwardly of the said beaded flange to define a locking recess, an inclined wall extending downwardly and outwardly from the inner end of the second ledge to the adjacent edge of the outer wall, the meeting point of the inner end of the inclined wall and the said second ledge defining a sharp locking shoulder, a securing portion extending downwardly from the outer end of the inclined wall and engaging the adjacent portion of the outer wall, and an overlapped portion on the adjacent edge of the outer wall and confining the securing portion therebetween to form an extended tongue, portions of said tongues being longitudinally crimped to form beads at the outer edges only of said tongues so that when adjoining sections are placed together the beads on the lower edge of one section will engage in the adjacent locking recess of the other section and be retained therein by the adjacent sharp locking recess.

In testimony whereof I affix my signature.

CHARLES M. BULLER.